US011703265B2

(12) United States Patent
Iyer et al.

(10) Patent No.: US 11,703,265 B2
(45) Date of Patent: Jul. 18, 2023

(54) COOLER WITH CARRY HANDLE

(71) Applicant: Igloo Products Corp., Katy, TX (US)

(72) Inventors: Vasanthi Iyer, Katy, TX (US); John Maldonado, Katy, TX (US); Roque Barros, Katy, TX (US)

(73) Assignee: Igloo Products Corp., Katy, TX (US)

( * ) Notice: Subject to any disclaimer, the term of this patent is extended or adjusted under 35 U.S.C. 154(b) by 0 days.

(21) Appl. No.: 17/000,862

(22) Filed: Aug. 24, 2020

(65) Prior Publication Data

US 2021/0071930 A1 Mar. 11, 2021

Related U.S. Application Data

(60) Provisional application No. 62/898,084, filed on Sep. 10, 2019.

(51) Int. Cl.
*F25D 3/08* (2006.01)
*B65D 25/28* (2006.01)
(Continued)

(52) U.S. Cl.
CPC ........... *F25D 3/08* (2013.01); *B65D 25/2802* (2013.01); *B65D 65/466* (2013.01); *B65D 81/3818* (2013.01)

(58) Field of Classification Search
CPC ..... F25D 3/08; B65D 25/2802; B65D 65/466; B65D 81/3818; B65D 25/28;
(Continued)

(56) References Cited

U.S. PATENT DOCUMENTS 2,181,150 A 11/1939 Pittenger
2,613,847 A * 10/1952 Lacher .................. B65D 25/28
220/759
(Continued)

FOREIGN PATENT DOCUMENTS

AU 2707277 1/1979
AU 83403 9/1981
(Continued)

OTHER PUBLICATIONS

Young, Lee, International Search Report and Written Opinion issued in PCT/US2020/047617, dated Feb. 16, 2021, 9 pages.
(Continued)

*Primary Examiner* — Jennifer Robertson
*Assistant Examiner* — Eric C Baldrighi
(74) *Attorney, Agent, or Firm* — Dinsmore & Shohl LLP

(57) ABSTRACT

A disposable cooler can include: (1) a body having a base and a plurality of support walls coupled to the base, the plurality of support walls and the base defining an interior cavity of the body, and the plurality of support walls extending upwardly from the base to form an opening at an upper terminus of the body in fluid communication with the interior cavity; (2) a lid configured to reversibly couple with the body, the lid shaped to cover the opening of the body; and (3) a handle for carrying the cooler which is extends along a first support wall, the base, an opposite support wall, and above and beyond the lid so that a user can carry and/or transport the cooler with one hand while keeping the other hand free. The body, lid, and handle can be made entirely of a compostable, recyclable, and/or biodegradable.

16 Claims, 7 Drawing Sheets

(51) Int. Cl.
*B65D 81/38* (2006.01)
*B65D 65/46* (2006.01)

(58) Field of Classification Search
CPC ............ B65D 81/3813; B65D 25/2835; B65D 25/2867; B65D 25/287; B65D 25/2873; Y02W 90/10
USPC .................................................... 220/592.03
See application file for complete search history.

(56) References Cited

U.S. PATENT DOCUMENTS

| | | | |
|---|---|---|---|
| 2,844,299 A | 7/1958 | Kessler et al. | |
| 3,194,462 A * | 7/1965 | Earls | B65D 61/00 294/170 |
| 3,266,623 A * | 8/1966 | Poferl | A47J 47/14 220/23.88 |
| 3,791,547 A | 2/1974 | Branscum | |
| 4,047,633 A | 9/1977 | Trombly | |
| 4,213,310 A | 7/1980 | Buss | |
| D257,934 S | 1/1981 | Buss | |
| 4,344,300 A | 8/1982 | Taylor | |
| D267,444 S | 1/1983 | Ruxton | |
| D268,979 S | 1/1983 | Ruxton | |
| D269,398 S | 6/1983 | Ruxton | |
| D289,597 S | 5/1987 | Averitt | |
| D292,056 S | 9/1987 | Decker | |
| 4,696,412 A | 9/1987 | McGowan | |
| 4,802,344 A * | 2/1989 | Livingston | F25D 3/08 62/457.2 |
| 4,823,554 A | 4/1989 | Trachtenberg et al. | |
| D307,998 S | 5/1990 | Costello | |
| 5,050,999 A * | 9/1991 | Van Loon, III | A45C 3/045 383/76 |
| D323,950 S | 2/1992 | Pleet | |
| 5,111,664 A | 5/1992 | Yang | |
| 5,154,309 A | 10/1992 | Wischusen, III et al. | |
| 5,165,583 A * | 11/1992 | Kouwenberg | A45C 11/20 224/148.3 |
| 5,263,339 A | 11/1993 | Evans | |
| 5,284,294 A | 2/1994 | Floyd | |
| 5,319,937 A | 6/1994 | Fritsch | |
| D349,007 S | 7/1994 | Costello | |
| D352,420 S | 11/1994 | Costello | |
| 5,427,308 A | 6/1995 | Swift et al. | |
| 5,582,343 A | 12/1996 | Dalvey | |
| 5,700,586 A * | 12/1997 | Lai | B32B 27/12 428/507 |
| 5,797,528 A * | 8/1998 | McDuffie | B65D 81/3886 224/148.4 |
| D400,053 S | 10/1998 | Coffee | |
| 5,860,281 A | 1/1999 | Coffee | |
| 5,924,302 A | 7/1999 | Derifield | |
| 6,085,926 A | 7/2000 | Weiss | |
| 6,295,830 B1 | 10/2001 | Newman | |
| 6,334,329 B1 * | 1/2002 | Weller | F25D 3/08 62/371 |
| 6,615,985 B1 | 9/2003 | Foreman | |
| D486,357 S | 2/2004 | Leba | |
| 6,705,469 B2 | 3/2004 | Slot | |
| D497,517 S | 10/2004 | Reuter | |
| D500,057 S | 12/2004 | Reuter | |
| 6,837,420 B2 | 1/2005 | Westerman et al. | |
| 6,962,263 B2 | 11/2005 | Cadiente et al. | |
| 7,051,550 B2 | 5/2006 | Roth | |
| D527,226 S | 8/2006 | Maldonado | |
| D528,368 S | 9/2006 | Maldonado | |
| D529,344 S | 10/2006 | Maldonado | |
| 7,140,507 B2 | 11/2006 | Maldonado | |
| D534,771 S | 1/2007 | Zorn | |
| 7,344,028 B2 | 3/2008 | Hanson | |
| 7,451,709 B2 | 11/2008 | Swartfager et al. | |
| 8,348,509 B2 * | 1/2013 | Wilkes | B65D 75/008 383/10 |
| 8,356,712 B2 | 1/2013 | Piazza, Jr. | |
| 8,408,620 B2 | 4/2013 | Gruppioni | |
| 8,763,811 B2 | 7/2014 | Lantz | |
| D734,642 S | 7/2015 | Vasbinder et al. | |
| 9,199,782 B1 | 12/2015 | Cliatt | |
| 9,366,467 B2 | 6/2016 | Kiedaisch | |
| 9,499,294 B1 | 11/2016 | Costanzo, Jr. | |
| 9,550,618 B1 | 1/2017 | Jobe | |
| D792,486 S | 7/2017 | Li | |
| 9,751,683 B1 | 9/2017 | Jobe | |
| D802,028 S | 11/2017 | Li | |
| D802,029 S | 11/2017 | Li | |
| D802,630 S | 11/2017 | Li | |
| 9,908,022 B1 | 3/2018 | Bowe | |
| 9,957,098 B2 | 5/2018 | Jobe | |
| D820,049 S | 6/2018 | Ahlstrom | |
| 10,046,901 B1 | 8/2018 | Jobe | |
| 10,059,495 B1 | 8/2018 | Korustan et al. | |
| 10,093,460 B2 | 10/2018 | Seiders et al. | |
| D836,993 S | 1/2019 | Meda | |
| D836,994 S | 1/2019 | Meda | |
| 10,167,184 B1 | 1/2019 | Samples | |
| D844,386 S | 4/2019 | Ahlstrom | |
| 10,307,761 B2 | 6/2019 | Schryver | |
| 10,392,177 B2 | 8/2019 | Lantz | |
| 10,551,110 B2 | 2/2020 | Waltermire et al. | |
| 10,597,219 B2 | 3/2020 | Jobe | |
| 10,618,690 B2 | 4/2020 | Jobe | |
| 10,625,923 B2 | 4/2020 | Jobe | |
| 10,625,925 B1 | 4/2020 | Jobe | |
| 10,633,165 B2 | 4/2020 | Aksan et al. | |
| 10,647,497 B2 | 5/2020 | Jobe | |
| D887,788 S | 6/2020 | Meda | |
| D888,503 S | 6/2020 | Meda | |
| D894,043 S | 8/2020 | Meda | |
| 10,800,595 B2 | 10/2020 | Waltermire et al. | |
| 10,807,788 B2 | 10/2020 | Jobe | |
| D901,986 S | 11/2020 | Meda | |
| 10,843,840 B2 | 11/2020 | Sollie et al. | |
| D904,830 S | 12/2020 | Meda | |
| D907,074 S | 1/2021 | Yang | |
| 10,947,025 B2 | 3/2021 | Sollie et al. | |
| D920,743 S | 6/2021 | Meda | |
| D921,439 S | 6/2021 | Meda | |
| 11,027,875 B2 | 6/2021 | Sollie et al. | |
| 11,027,885 B2 | 6/2021 | Duong | |
| 11,040,818 B2 | 6/2021 | Jobe | |
| 11,066,228 B2 | 7/2021 | Sollie et al. | |
| 11,072,483 B2 | 7/2021 | Jobe | |
| D927,938 S | 8/2021 | Meda | |
| D929,471 S | 8/2021 | Meda | |
| 11,097,886 B2 | 8/2021 | Lantz | |
| D933,449 S | 10/2021 | Ahlström et al. | |
| 11,142,371 B2 | 10/2021 | Jobe | |
| 11,142,383 B2 | 10/2021 | Thompson | |
| D935,280 S | 11/2021 | Thelin | |
| 11,230,404 B2 | 1/2022 | Sollie et al. | |
| 11,247,827 B2 | 2/2022 | Jobe | |
| D953,814 S | 6/2022 | Thelin | |
| D954,764 S | 6/2022 | Meda | |
| 11,358,780 B2 | 6/2022 | Jobe | |
| 11,359,848 B2 | 6/2022 | Guan | |
| 2002/0020104 A1 | 2/2002 | Kolar et al. | |
| 2003/0216492 A1 | 11/2003 | Bowden et al. | |
| 2004/0089582 A1 | 5/2004 | Hendrix, Jr. | |
| 2004/0178208 A1 | 9/2004 | Minh | |
| 2005/0035119 A1 | 2/2005 | Hull et al. | |
| 2005/0109776 A1 | 5/2005 | Camp, Jr. | |
| 2005/0127081 A1 | 6/2005 | Minh | |
| 2005/0150624 A1 | 7/2005 | Toh et al. | |
| 2005/0198992 A1 | 9/2005 | Mogil et al. | |
| 2005/0263432 A1 | 12/2005 | Hanson | |
| 2005/0263527 A1 | 12/2005 | Maldonado | |
| 2005/0263528 A1 | 12/2005 | Maldonado | |
| 2005/0279123 A1 | 12/2005 | Maldonado | |
| 2005/0279124 A1 | 12/2005 | Maldonado | |
| 2006/0163252 A1 | 7/2006 | Zalewski | |
| 2007/0023439 A1 | 2/2007 | Vaughn | |
| 2007/0125118 A1 | 6/2007 | Hooper | |

(56) References Cited

U.S. PATENT DOCUMENTS

| | | |
|---|---|---|
| 2007/0151685 A1 | 7/2007 | Horsfield et al. |
| 2008/0001373 A1 | 1/2008 | Vaughn |
| 2008/0006629 A1 | 1/2008 | Roth |
| 2008/0025544 A1 | 1/2008 | Maldonado |
| 2010/0052353 A1 | 3/2010 | Shea et al. |
| 2010/0065574 A1* | 3/2010 | Brooks .................. A45F 5/10 220/754 |
| 2010/0078442 A1* | 4/2010 | Donchez ............ B65D 5/46008 220/754 |
| 2010/0212351 A1 | 8/2010 | Chapin et al. |
| 2010/0258574 A1 | 10/2010 | Bentley |
| 2011/0182532 A1 | 7/2011 | Baltus |
| 2011/0197625 A1 | 8/2011 | Urban |
| 2013/0112694 A1 | 5/2013 | Bentley |
| 2013/0340467 A1 | 12/2013 | Kiedaisch |
| 2014/0021208 A1 | 1/2014 | Anti et al. |
| 2015/0053676 A1 | 2/2015 | Sand |
| 2015/0158656 A1 | 6/2015 | McKinnon |
| 2015/0320191 A1 | 11/2015 | Stevens |
| 2015/0344211 A1 | 12/2015 | Moon |
| 2016/0052692 A1 | 2/2016 | Branham |
| 2017/0023290 A1 | 1/2017 | DeMuth |
| 2017/0043937 A1 | 2/2017 | Lantz |
| 2017/0101301 A1 | 4/2017 | Volin |
| 2017/0355501 A1 | 12/2017 | Furio |
| 2018/0141718 A1 | 5/2018 | Ahlstrom |
| 2018/0162597 A1 | 6/2018 | Jobe |
| 2018/0194534 A1 | 7/2018 | Jobe |
| 2018/0201432 A1 | 7/2018 | Harding |
| 2018/0229916 A1 | 8/2018 | Jobe |
| 2018/0237184 A1 | 8/2018 | Jobe |
| 2018/0237206 A1 | 8/2018 | Jobe |
| 2018/0305109 A1 | 10/2018 | Jobe |
| 2018/0327171 A1* | 11/2018 | Waitermire .......... B65D 81/386 |
| 2018/0339838 A1 | 11/2018 | Hall |
| 2019/0032991 A1 | 1/2019 | Waitermire et al. |
| 2019/0047743 A1 | 2/2019 | Costanzo, Jr. |
| 2019/0161240 A1 | 5/2019 | Ahlstrom |
| 2019/0329961 A1 | 10/2019 | Jobe |
| 2019/0367208 A1 | 12/2019 | Jobe |
| 2019/0367209 A1 | 12/2019 | Jobe |
| 2020/0062454 A1 | 2/2020 | Duong |
| 2020/0102139 A1* | 4/2020 | Jobe .................... B65D 65/466 |
| 2020/0122909 A1 | 4/2020 | Jobe |
| 2020/0140165 A1 | 5/2020 | Maldonado |
| 2020/0180838 A1 | 6/2020 | Lantz |
| 2020/0180846 A1 | 6/2020 | Jobe |
| 2020/0216229 A1 | 7/2020 | Weixian |
| 2020/0217571 A1 | 7/2020 | Weixian |
| 2020/0217574 A1 | 7/2020 | Thelin |
| 2020/0217575 A1 | 7/2020 | Thelin |
| 2020/0217576 A1 | 7/2020 | Weixian |
| 2020/0217578 A1 | 7/2020 | Wang |
| 2020/0270053 A1 | 8/2020 | Jobe |
| 2020/0307895 A1 | 10/2020 | Jobe |
| 2020/0317425 A1 | 10/2020 | Jobe |
| 2020/0407147 A1 | 12/2020 | Jobe |
| 2021/0070523 A1 | 3/2021 | Iyer |
| 2021/0070528 A1 | 3/2021 | Iyer |
| 2021/0071930 A1 | 3/2021 | Iyer |
| 2021/0123656 A1 | 4/2021 | Barros |
| 2021/0127808 A1 | 5/2021 | Thelin |
| 2021/0214123 A1 | 7/2021 | Iyer |
| 2021/0229893 A1 | 7/2021 | Maldonado |
| 2021/0253305 A1 | 8/2021 | Duong |
| 2021/0285710 A1 | 9/2021 | Barros |
| 2022/0114847 A1 | 4/2022 | Emde |
| 2022/0114853 A1 | 4/2022 | Emde |
| 2022/0119152 A1 | 4/2022 | Blankinship |
| 2022/0154411 A1 | 5/2022 | Henry, Jr. et al. |
| 2022/0219877 A1 | 7/2022 | Jobe |
| 2022/0228406 A1 | 7/2022 | Barros |
| 2022/0258946 A1 | 8/2022 | Lantz |

FOREIGN PATENT DOCUMENTS

| | | |
|---|---|---|
| AU | 83402 | 4/1982 |
| AU | 93721 | 10/1986 |
| AU | 2003200086 | 7/2003 |
| AU | 2005262599 | 1/2006 |
| AU | 2011215734 | 8/2012 |
| AU | 201712770 | 5/2017 |
| AU | 201712777 | 5/2017 |
| AU | 201712780 | 5/2017 |
| AU | 201712782 | 5/2017 |
| AU | 201712791 | 5/2017 |
| AU | 201712799 | 5/2017 |
| AU | 201712802 | 5/2017 |
| AU | 201712803 | 5/2017 |
| AU | 201712785 | 7/2017 |
| AU | 201716789 | 11/2017 |
| AU | 201716791 | 11/2017 |
| AU | 201717667 | 1/2018 |
| AU | 201717669 | 1/2018 |
| AU | 201717670 | 1/2018 |
| AU | 201717674 | 1/2018 |
| AU | 201717676 | 1/2018 |
| AU | 201717662 | 2/2018 |
| AU | 2016304711 | 3/2018 |
| AU | 2017240890 | 11/2018 |
| AU | 201816061 | 1/2019 |
| AU | 201910011 | 2/2019 |
| AU | 201913598 | 8/2019 |
| AU | 201913601 | 8/2019 |
| AU | 201913603 | 8/2019 |
| AU | 201913604 | 8/2019 |
| AU | 201913607 | 8/2019 |
| AU | 201913624 | 8/2019 |
| AU | 201913626 | 8/2019 |
| AU | 201913627 | 8/2019 |
| AU | 201913631 | 8/2019 |
| AU | 201913633 | 8/2019 |
| AU | 202012548 | 6/2020 |
| AU | 2020125454 | 6/2020 |
| AU | 2019284128 | 7/2020 |
| AU | 2019284129 | 7/2020 |
| AU | 2019284130 | 7/2020 |
| AU | 2019284131 | 7/2020 |
| AU | 2019284133 | 7/2020 |
| AU | 2019284134 | 7/2020 |
| AU | 2019302329 | 1/2021 |
| AU | 2019325454 | 1/2021 |
| AU | 2019376154 | 3/2021 |
| AU | 2019371335 | 5/2021 |
| AU | 2021225159 | 9/2021 |
| CA | 48429 | 7/1981 |
| CA | 48762 | 10/1981 |
| CA | 53100 | 7/1984 |
| CA | 1281859 | 3/1991 |
| CA | 2229259 | 8/1998 |
| CA | 2460597 | 9/2004 |
| CA | 2570413 | 1/2006 |
| CA | 2789507 | 8/2011 |
| CA | 2995339 | 2/2017 |
| CA | 3019638 | 10/2017 |
| CA | 3059900 | 8/2018 |
| CA | 3059901 | 8/2018 |
| CA | 179459 | 12/2018 |
| CA | 179460 | 12/2018 |
| CA | 3105713 | 1/2020 |
| CA | 3106550 | 2/2020 |
| CA | 3117297 | 5/2020 |
| CN | 101370699 | 2/2009 |
| CN | 101431913 | 5/2009 |
| CN | 201235982 Y | 5/2009 |
| CN | 106068433 A | 11/2016 |
| CN | 109195880 | 1/2019 |
| CN | 106233083 | 7/2019 |
| CN | 110191654 | 8/2019 |
| CN | 110267883 | 9/2019 |
| CN | 110536844 | 12/2019 |
| CN | 110536845 | 12/2019 |
| CN | 305553099 | 1/2020 |

(56) References Cited

FOREIGN PATENT DOCUMENTS

| | | |
|---|---|---|
| CN | 305751278 | 5/2020 |
| CN | 306079204 | 9/2020 |
| CN | 112424547 | 2/2021 |
| CN | 112585416 | 3/2021 |
| CN | 112739630 | 4/2021 |
| CN | 112955703 | 6/2021 |
| CN | 112996411 | 6/2021 |
| CN | 113023106 | 6/2021 |
| DE | 2609519 A1 | 9/1977 |
| DE | 3020740 A1 | 12/1981 |
| DE | 20110247 | 12/2002 |
| DE | 10146618 A1 | 4/2003 |
| DE | 202004010081 | 9/2004 |
| DE | 202007001638 | 5/2007 |
| DE | 202009015164 | 3/2010 |
| DE | 202013007655 | 1/2015 |
| DE | 102013016278 A1 | 4/2015 |
| DE | 102019200065 | 1/2019 |
| DE | 102019200067 | 1/2019 |
| DE | 102019200068 | 1/2019 |
| DE | 102019200070 | 1/2019 |
| DE | 112017005901 | 8/2019 |
| DE | 102019200063 | 7/2020 |
| DE | 102019200064 | 7/2020 |
| EP | 1765109 | 3/2007 |
| EP | 2534026 | 12/2012 |
| EP | 3334665 | 6/2018 |
| EP | 3571126 | 11/2019 |
| EP | 3583050 | 12/2019 |
| EP | 3585707 | 1/2020 |
| EP | 3821186 | 5/2021 |
| EP | 3826941 | 6/2021 |
| EP | 3841338 | 6/2021 |
| EP | 3856658 | 8/2021 |
| EP | 3874211 | 9/2021 |
| EP | 3876785 | 9/2021 |
| EP | 3436368 | 12/2021 |
| EP | 4019428 | 6/2022 |
| EP | 4029806 | 7/2022 |
| ES | 1030365 | 8/1995 |
| ES | 1030365 Y | 7/1996 |
| GB | 1198352 A | 7/1970 |
| HK | 1256949 | 10/2019 |
| JP | 11006677 | 1/1999 |
| JP | 2003-128163 A | 5/2003 |
| JP | 2004299764 A | 10/2004 |
| JP | 2005053510 A | 3/2005 |
| KR | 1020040080384 | 9/2004 |
| KR | 20110000450 U * | 11/2017 | ............... F25D 3/08 |
| KR | 1020180136462 | 12/2018 |
| KR | 1020190122725 | 10/2019 |
| KR | 1020210038924 | 4/2021 |
| KR | 1020210040356 | 4/2021 |
| KR | 1020210048496 | 5/2021 |
| KR | 1020210072022 | 6/2021 |
| KR | 1020210084483 | 7/2021 |
| MX | PA04001493 | 12/2004 |
| MX | PA06014878 | 10/2007 |
| MX | 2018011945 | 9/2019 |
| MX | 2019009851 | 12/2019 |
| MX | 2019010120 | 12/2019 |
| WO | WO-0209975 A1 * | 2/2002 | ............. A45C 11/20 |
| WO | 2005123539 | 12/2005 |
| WO | 2006007266 | 1/2006 |
| WO | 2006009537 | 1/2006 |
| WO | 2007016092 | 2/2007 |
| WO | 2008013973 | 1/2008 |
| WO | 2011094355 | 8/2011 |
| WO | 2011100522 | 8/2011 |
| WO | WO2017172029 | 10/2017 |
| WO | 2018095957 | 5/2018 |
| WO | WO2018107087 | 6/2018 |
| WO | WO2018152367 | 8/2018 |
| WO | WO2018156481 | 8/2018 |
| WO | WO2018165164 | 9/2018 |
| WO | WO2019231934 | 12/2019 |
| WO | 2020013913 | 1/2020 |
| WO | WO2020023520 | 1/2020 |
| WO | 2020041236 | 2/2020 |
| WO | WO2020069444 | 4/2020 |
| WO | 2020091849 | 5/2020 |
| WO | WO2020092023 | 5/2020 |
| WO | WO2020176294 | 9/2020 |
| WO | 2021050253 | 3/2021 |
| WO | 2021050255 | 3/2021 |
| WO | 2021050298 | 3/2021 |
| WO | 2021086620 | 5/2021 |
| WO | 2021145971 | 7/2021 |
| WO | 2021154394 | 8/2021 |
| WO | 2022081513 | 4/2022 |
| WO | WO-2022189901 A1 * | 9/2022 | ............... B65D 1/34 |
| WO | WO-2022189904 A1 * | 9/2022 | ............... B65D 1/36 |
| WO | WO-2022238971 A1 * | 11/2022 | ............. B65D 65/46 |

OTHER PUBLICATIONS

Design U.S. Appl. No. 29/708,155, filed Oct. 3, 2019 titled Latch.
Design U.S. Appl. No. 29/708,156, filed Oct. 3, 2019 titled Latch.
Dometic Product Catalog—Coolers; 2015.
Dometic Product Catalog—Coolers; 2016.
Design U.S. Appl. No. 29/820,716, filed Dec. 23, 2021 titled Container.
Design U.S. Appl. No. 29/820,717, filed Dec. 23, 2021 titled Container.
U.S. Appl. No. 17/668,767, filed Feb. 10, 2022 titled Insulated Container.
U.S. Appl. No. 17/720,019, filed Apr. 13, 2022 titled Packable Cooler Bag.
PCT Application No. PCT/IB2022/056075 filed Jun. 29, 2022 titled Soft-Sided Cooler.
U.S. Appl. No. 63/353,281, filed Jun. 17, 2022 titled Insulated Container.
PCT Application No. PCT/US2022/031282 filed May 27, 2022 titled Insulated Container.
U.S. Appl. No. 17/825,374, filed May 26, 2022 titled Mobile Cooling Box with Ice Maker.
Design U.S. Appl. No. 29/840,161, filed May 26, 2022 titled Cooler Fender Frame.
U.S. Appl. No. 17/872,514, filed Jul. 25, 2022 titled Mobile Cooling Box with Hinge Module.
U.S. Appl. No. 17/874,162, filed Jul. 26, 2022 titles Thermal Insulation Bag.
PCT Application No. PCT/US2022/026932 filed Apr. 29, 2022 titled Accessory Grid Apparatus for a Cooler.
U.S. Appl. No. 17/875,693, filed Jul. 28, 2022 titled Containment System Including a Soft Container.
Design U.S. Appl. No. 29/836,642, filed Apr. 28, 2022 titled Half Sleeve Ice Block.
Design U.S. Appl. No. 29/823,704, filed Jan. 19, 2022 titled Insulated Box.
MX Application No. MX/f/2022/002028 filed Jul. 19, 2022 titled Insulated Box.
EU App. No. 009092620 filed Jul. 19, 2022 titled Insulated Box.
U.S. Appl. No. 17/874,701, filed Jul. 27, 2022 titled Locking Module for a Container.
PCT Application No. PCT/US2022/038492 filed Jul. 27, 2022 titled Locking Module for a Container.
U.S. Appl. No. 17/887,106, filed Aug. 12, 2022 titled Cooler.
U.S. Appl. No. 17/886,803, filed Aug. 12, 2022 titled Mobile Cooling Box with Handle Module.
Canadian Application No. 214387 filed Jul. 19, 2022 titled Insulated Box.
"HighTide lacing braid dead pulp box large size" (Rakuten) Nov. 22, 2016 (nov. 22, 2016), retrieved from Internet, <URL:https://lglobal.rakuten.com/en/store/1em-rue/item/948-rs001/>; entire document, especially Fig. 1-4, product information.
23 3/4" x 14" White Foam Food Pan Carrier (webstaurantstore.com) Jul. 28, 2016 (Jul. 28, 2016), retrieved from Internet, https://www.webstaurantstore.com/restaurant-storage-transport.html; entire document especially, Fig. 1, 5, specs.

(56) References Cited

OTHER PUBLICATIONS

"30 Qt. Promo Cooler" (homedepot.com) Nov. 8, 2015 (Nov. 8, 2015), retrieved from Internet, https://www.homedepot.com/p/30-Qt-Promo-Cooler-3542/203336080, entire document especially Fig. 1, product overview.
"Cool sustainability; Vericool provides environmental edge with innovative chill packs", Retrieved from the Internet: URL: https://www.packaginginsights.com/news/chilled-packaging-vericool-coolers-provide-sustainable-edge-in-fresh-food-delivery.html, Sep. 3, 2018, 2 pages.
International Search Report and Written Opinion issued in PCT/US2019/037896, dated Sep. 16, 2019, 11 pages.
NS Packaging, Vericool unveils sustainable product lines: URL: https://www.nspackaging.com/news/vericoolsustainable-coolers/, Oct. 15, 2018, 2 pages.
Vericool Inc, To Unveil Revolutionary Reusable Sustainable Consumer Cooler, at 2018 Pack Expo in Chicago, Oct. 11, 2018, 2 Pages.
Office Action and Search Report issued in Chinese Application No. 201980071993.2 dated May 27, 2022, 10 pages.
Partial Supplementary European Search Report issued in EP Patent Application No. 19879731.8 dated Jul. 8, 2022.
Australia Patent Application No. 2019371335 titled "Single-Walled Disposable Cooler Made of Disposable, Biodegradable and/or Recyclable Material" filed Aug. 4, 2021.
Canada Patent Application No. 3117297 titled "Single-Walled Disposable Cooler Made of Disposable, Biodegradable and/or Recyclable Material" filed Apr. 21, 2021.
Chinese Patent Application No. 201980071993.2 titled "Single-Walled Disposable Cooler Made of Disposable, Biodegradable and/or Recyclable Material" filed Apr. 21, 2021.
European Patent Application No. 19879731.8 titled "Single-Walled Disposable Cooler Made of Disposable, Biodegradable and/or Recyclable Material" filed Feb. 6, 2021.
Japanese Patent Application No. 2021-524237 titled "Single-Walled Disposable Cooler Made of Disposable, Biodegradable and/or Recyclable Material" filed Jun. 5, 2021.
Korean Patent Application No. 10-2021-7013187 titled "Single-Walled Disposable Cooler Made of Disposable, Biodegradable and/or Recyclable Material" filed Apr. 30, 2021.
Mexican Patent Application No. MX/a/2021/005094 titled "Single-Walled Disposable Cooler Made of Disposable, Biodegradable and/or Recyclable Material" filed Apr. 30, 2021.
PCT Patent Application No. PCT/US2019/037896 titled "Single-Walled Disposable Cooler Made of Disposable, Biodegradable and/or Recyclable Material" filed Jun. 19, 2019.
International Preliminary Report on Patentability issued in PCT Patent Application No. PCT/US2019/037896 dated May 14, 2021.
U.S. Appl. No. 62/754,829 titled "Single-Walled Disposable Cooler Made of Disposable, Biodegradable and/or Recyclable Material" filed Nov. 2, 2018.
U.S. Appl. No. 16/445,566 titled "Single-Walled Disposable Cooler Made of Disposable, Biodegradable and/or Recyclable Material" filed Jun. 19, 2019.
U.S. Appl. No. 62/898,117 titled "Biodegradable Cooler" filed Sep. 10, 2019.
U.S. Appl. No. 17/000,897 titled "Biodegradable Cooler" filed Aug. 24, 2020.
Restriction Requirement issued in U.S. Appl. No. 17/000,897 dated Mar. 18, 2022.
Non-Final Office Action issued in U.S. Appl. No. 17/000,897 dated Jun. 13, 2022.
PCT Application No. PCT/US2020/047621 titled "Biodegradable Cooler" filed Aug. 24, 2020.
International Search Report and Written Opinion issued in PCT Application No. PCT/US2020/047621 dated Nov. 6, 2020.
International Preliminary Report on Patentability issued in PCT Application No. PCT/US2020/047621 dated Mar. 24, 2022.
European Patent Application No. 20862298.5 titled "Biodegradable Cooler" filed Mar. 9, 2022.
China Patent Application No. 202080063536.1 titled "Biodegradable Cooler" filed Mar. 10, 2022.
Australia Patent Application No. 2020345686 titled "Biodegradable Cooler" filed Mar. 9, 2022.
U.S. Appl. No. 62/898,084 titled "Cooler With Carry Handle" filed Sep. 10, 2019.
PCT Application No. PCT/US2020/047617 titled "Cooler With Carry Handle" filed Aug. 24, 2020.
International Preliminary Report on Patentability issued in PCT Application No. PCT/US2020/047617 dated Mar. 24, 2022.
European Application No. 20862934.5 titled "Cooler With Carry Handle" filed Mar. 9, 2022.
China Application No. 202080063584.0 titled "Cooler With Carry Handle" filed Mar. 10, 2022.
Australia Application No. 2020346704 titled "Cooler With Carry Handle" filed Mar. 9, 2022.
U.S. Appl. No. 62/898,089 titled "Double-Walled, Slip Fit Cooler" filed Sep. 10, 2019.
U.S. Appl. No. 17/006,282 titled "Double-Walled, Slip Fit Cooler" filed Aug. 28, 2020.
Non-Final Office Action issued in U.S. Appl. No. 17/006,282 dated Sep. 7, 2021.
Final Office Action issued in U.S. Appl. No. 17/006,282 dated Jan. 5, 2022.
Advisory Action issued in U.S. Appl. No. 17/006,282 dated Apr. 21, 2022.
Non-Final Office Action issued in U.S. Appl. No. 17/006,282 dated Jun. 29, 2022.
PCT Application No. PCT/US2020/048504 titled "Double-Walled, Slip Fit Cooler" filed Aug. 24, 2020.
International Search Report and Written Opinion issued in PCT Application No. PCT/US2020/048504 dated Nov. 20, 2020.
International Preliminary Report on Patentability issued in PCT Application No. PCT/US2020/048504 dated Mar. 24, 2022.
European Application No. 20862669.7 titled "Double-Walled, Slip Fit Cooler" filed Mar. 9, 2022.
China Application No. 202080063537.6 titled "Double-Walled, Slip Fit Cooler" filed Mar. 10, 2022.
Australia Application No. 2020345695 titled "Double-Walled, Slip Fit Cooler" filed Mar. 9, 2022.
Office Action issued in Chinese Application No. 201980071993.2 dated Oct. 19, 2022.
Extended European Search Report issued in European Patent Application No. 19879731.8 dated Oct. 20, 2022.
Office Action issued in Chinese Application No. 201980071993.2 dated Feb. 3, 2023.
Non-Final Office Action issued in U.S. Appl. No. 17/000,897 dated Jan. 23, 2023.
Non-Final Office Action issued in U.S. Appl. No. 16/445,566 dated Jan. 30, 2023.
Non-Final Office Action issued in U.S. Appl. No. 17/006,282 dated Apr. 17, 2023.
Advisory Action issued in U.S. Appl. No. 17/006,282 dated Mar. 15, 2023.
Office Action issued in Japanese Application No. 2021-524237 dated Apr. 4, 2023.

* cited by examiner

COOLER WITH CARRY HANDLE

RELATED APPLICATIONS

The present application claims priority under 35 U.S.C. § 119 to U.S. Provisional Application No. 62/898,084, entitled "Cooler With Carry Handle", filed on Sep. 10, 2019, the entirety of which is incorporated by reference herein.

TECHNICAL FIELD

The present disclosure relates generally to coolers, and more particularly, to a cooler with a carry handle. In certain embodiments, the cooler may be a disposable cooler with carry handle made of a disposable, biodegradable and/or recyclable materials; however, in other embodiments, the cooler and/or handle may not be made of a disposable, biodegradable and/or recyclable materials.

BACKGROUND

Coolers, ice chests, ice boxes, or the like are commonly used to store contents (e.g., food, beverages, etc.) and keep said contents cool. While many coolers are constructed using durable materials intended for repeated use, other coolers have been manufactured to be disposable. Coolers of the disposable variety are conventionally made from polystyrene foam (i.e., Styrofoam).

Problematically, polystyrene is a non-biodegradable solid that resists chemicals otherwise causing the material to break down. Disposal of polystyrene coolers, consequently, can cause significant environmental harm as discarded polystyrene will persist in the environment for centuries. Many cities and counties across the United States have passed regulations banning sale of polystyrene products for this reason.

Further, many coolers of the disposable variety generally use handles that are incorporated into the body of the cooler, such as an indentation created in a wall of the cooler. These handles require the users to use both hands in transporting the cooler from one place to another, thereby not allowing the user to have a free hand in carrying other items. Better handles are desired in these coolers that would allow users to carry it with one hand and keep the other hand either free or for carrying other items.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1A:
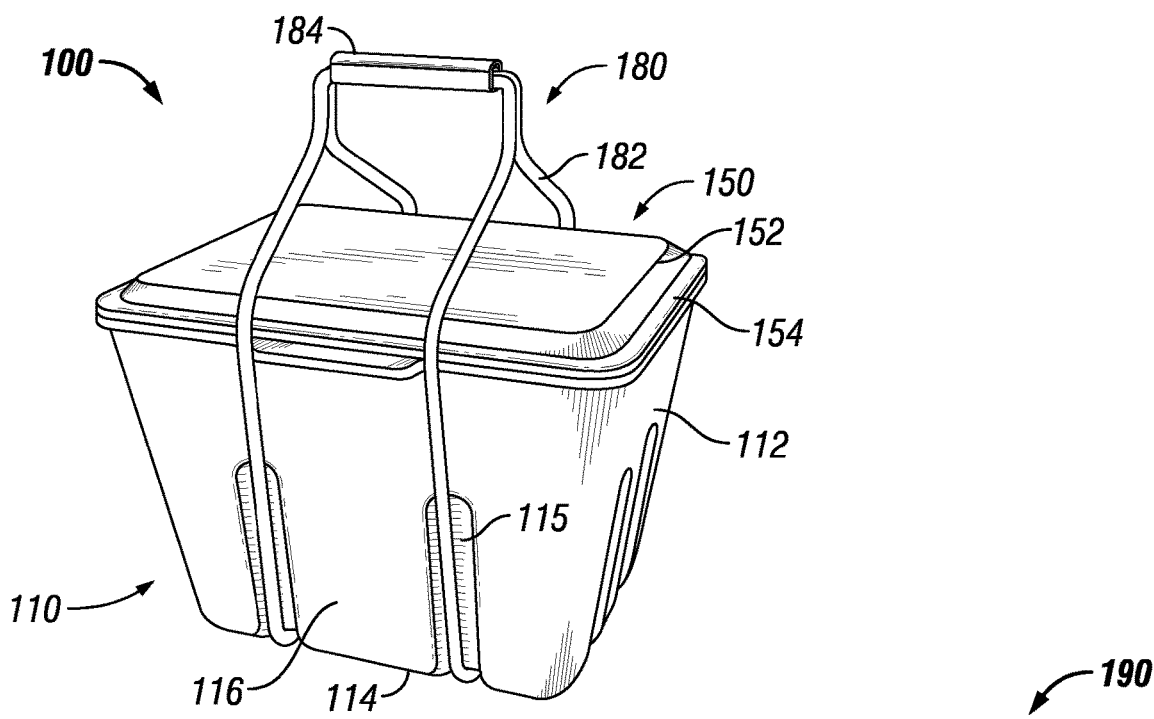
FIG. 1A shows a perspective view of a double-walled disposable cooler with handle in accordance with a first embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, the disposable cooler discussed herein can be made of a disposable, biodegradable and/or recyclable material, such as a pulp-based material, or made from paper, sugar cane, hemp, bamboo, or the like. Because the pulp-based material, or other similar type material, is compostable, recyclable, and/or biodegradable, the cooler can be disposed in an environmentally friendly manner in which the cooler degrades rapidly relative to conventional polystyrene coolers and without toxic residues. Although various embodiments of the disposable cooler described herein has been described as a double-walled cooler, the disposable cooler is not limited to such and can be a single-walled cooler without limiting the scope and spirit of the present invention. Further, the cooler may not be disposable or made from a biodegradable and/or recyclable material according to some embodiments of the invention.

Figure 2A:
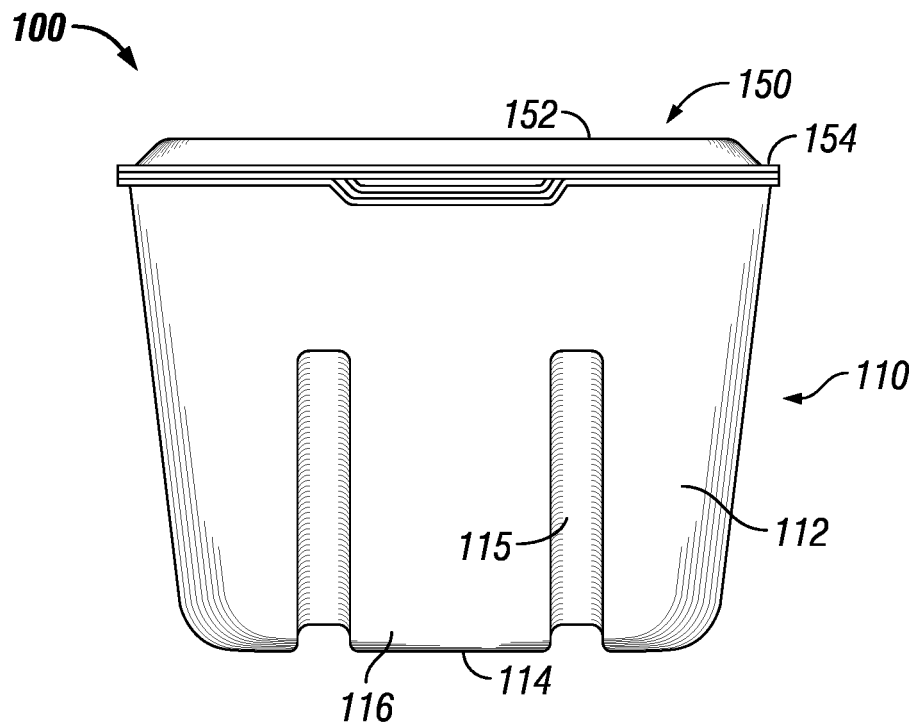
FIG. 2A shows a front view of the double-walled disposable cooler of FIG. 1A without the handle in accordance with the first embodiment of the present disclosure.
Figure 2B:
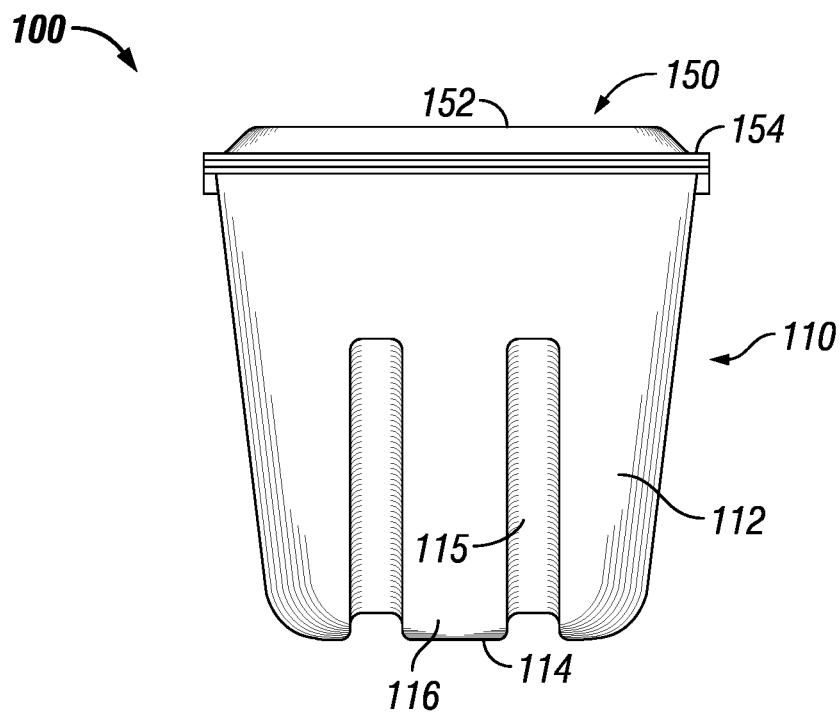
FIG. 2B shows a side view of the double-walled disposable cooler of FIG. 1A without the handle in accordance with the first embodiment of the present disclosure.
Figure 2C:
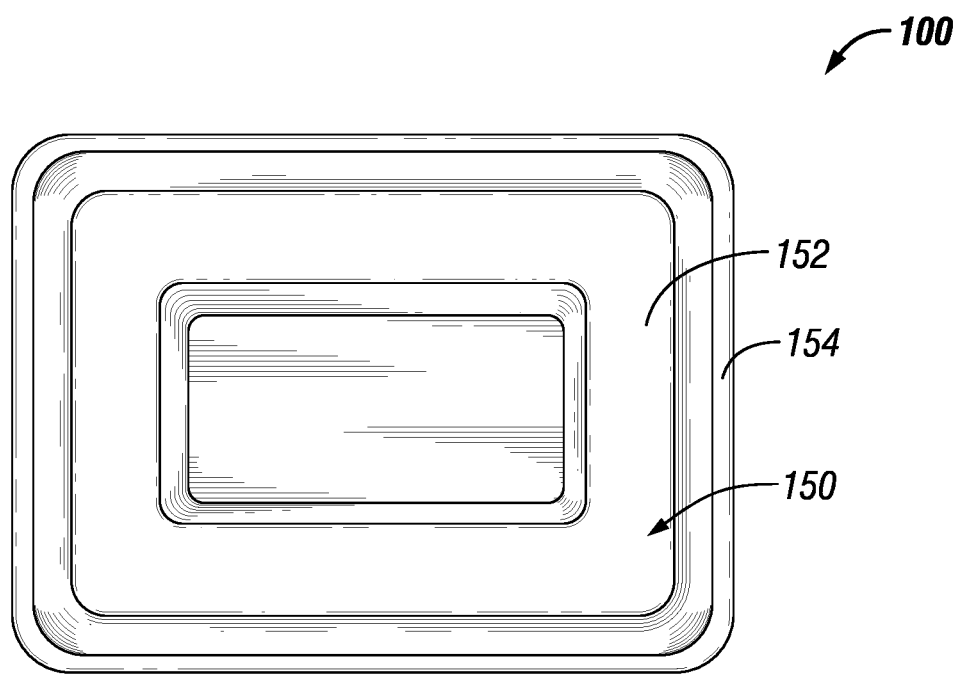
FIG. 2C shows a top view of the double-walled disposable cooler of FIG. 1A without the handle in accordance with the first embodiment of the present disclosure.
Figure 2D:
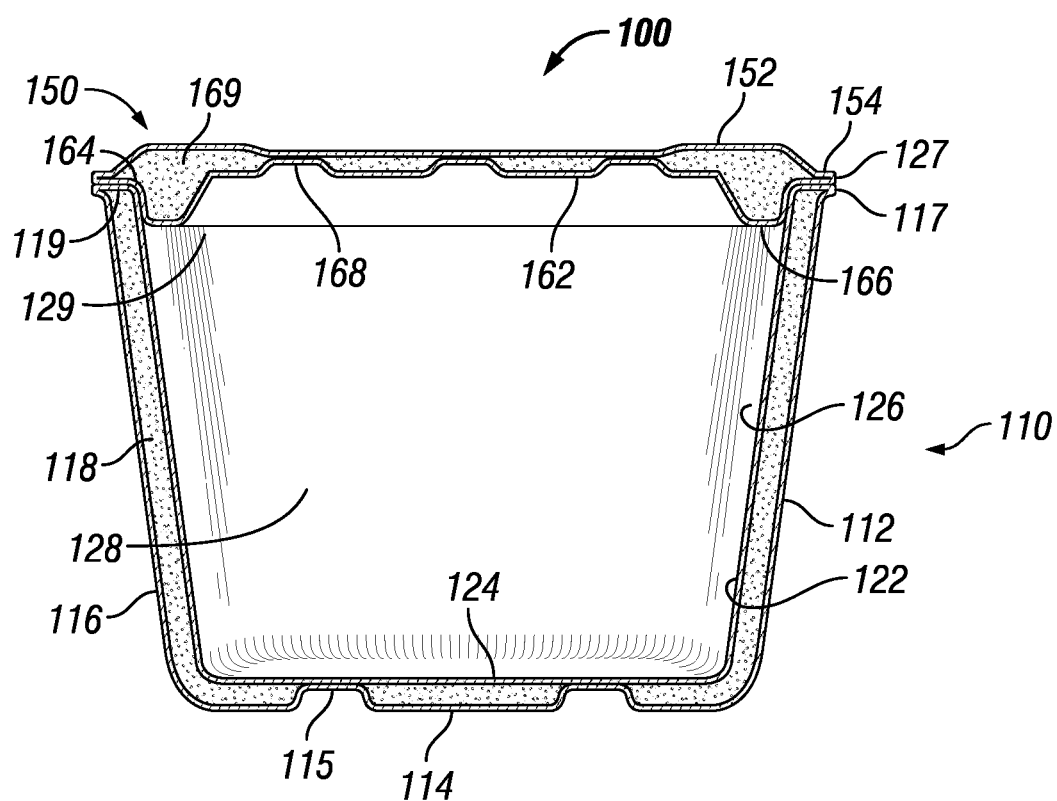
FIG. 2D shows a cross-sectional side view of the double-walled disposable cooler of FIG. 1A without the handle in accordance with the first embodiment of the present disclosure.
Figure 3A:
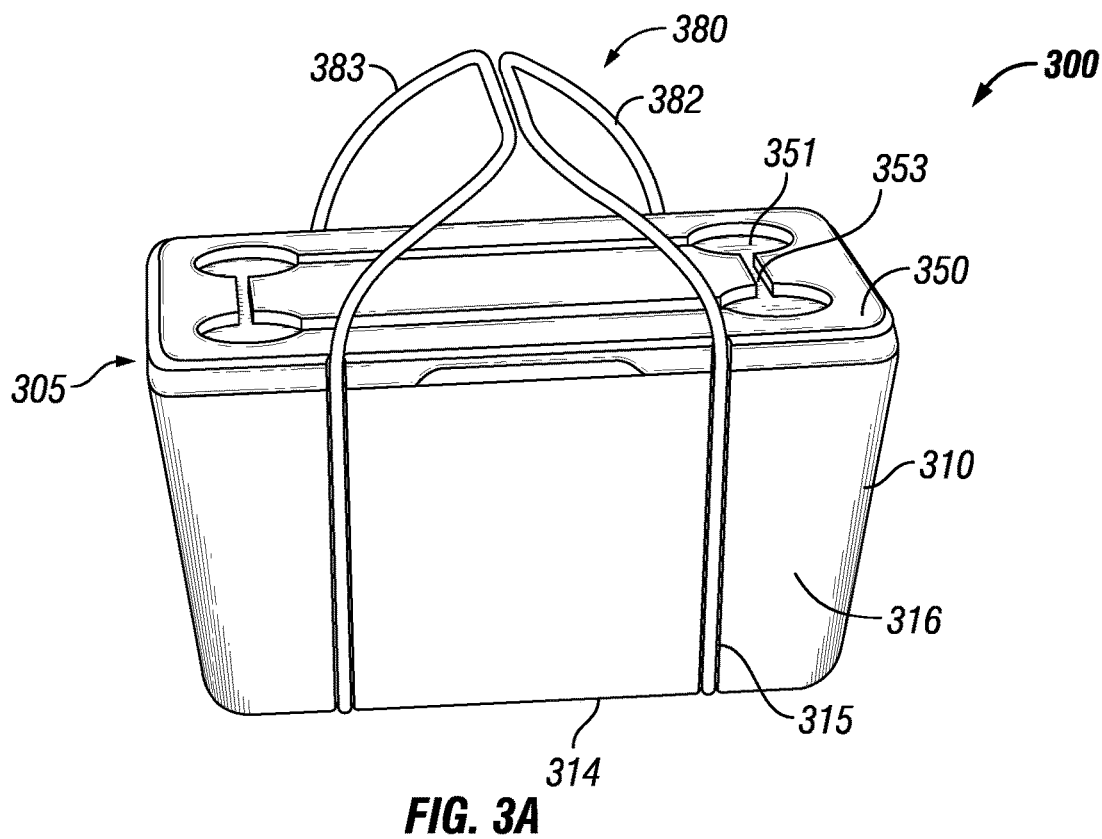
FIG. 3A shows a perspective view of a double-walled disposable cooler with handle in accordance with a second embodiment of the present disclosure.
Figure 3B:
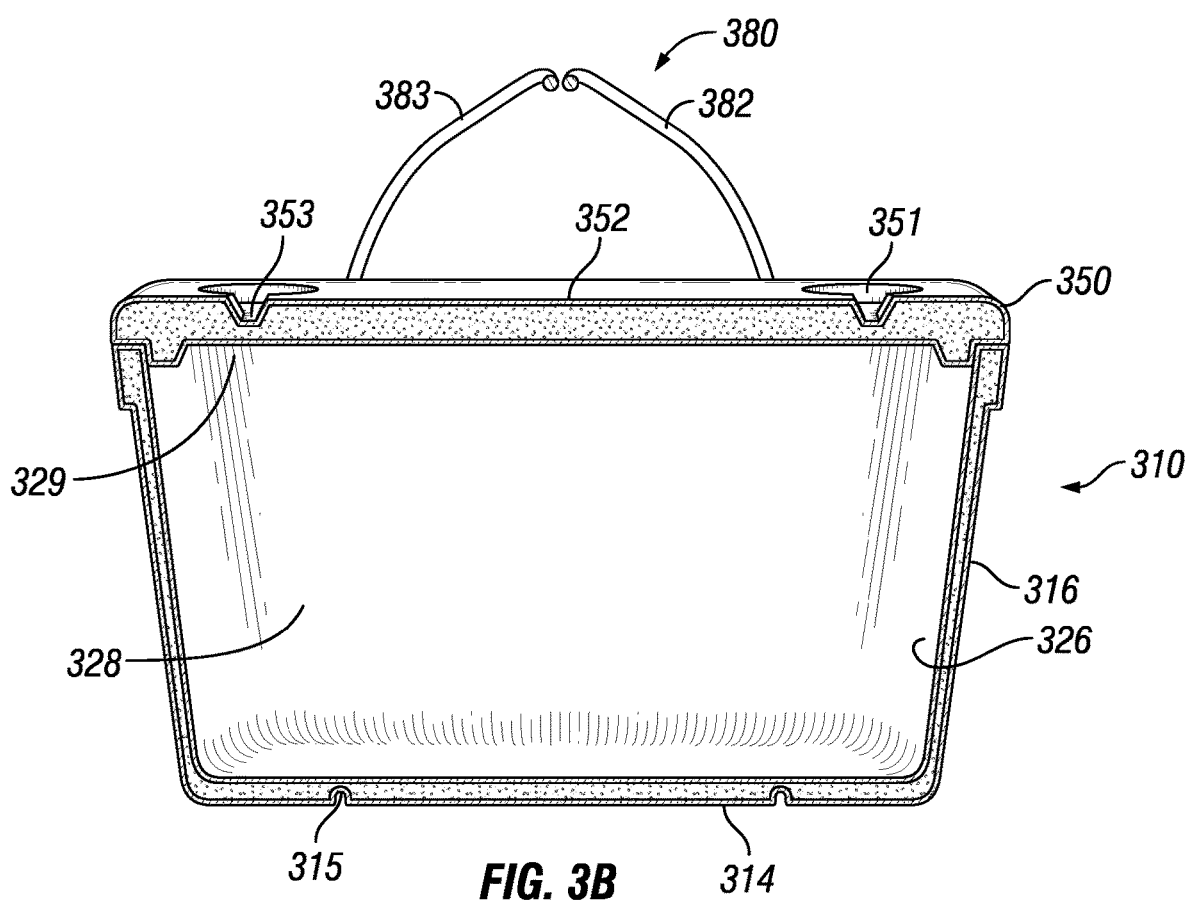
FIG. 3B shows a cross-sectional side view of the double-walled disposable cooler of FIG. 3A in accordance with the second embodiment of the present disclosure.
Figure 3C:
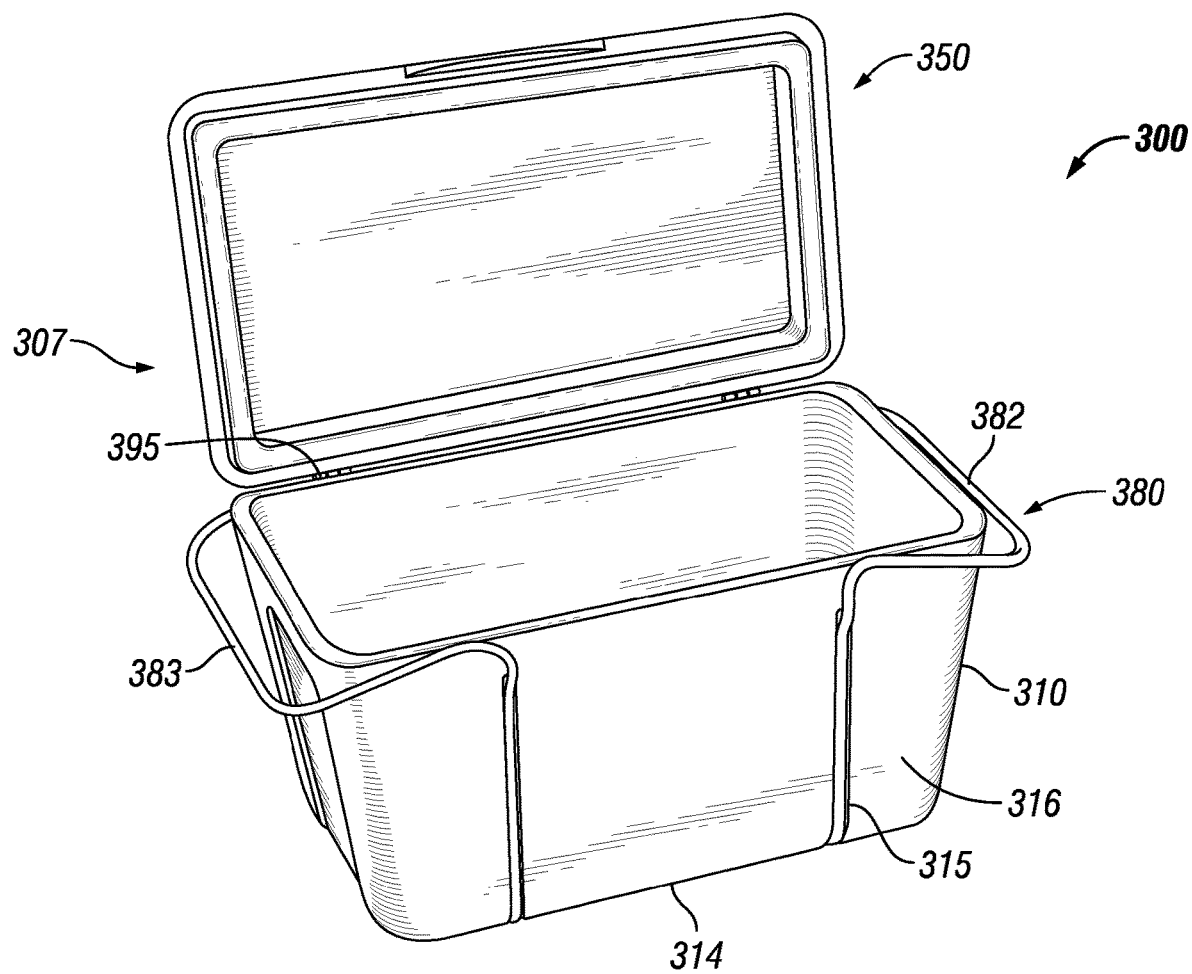
FIG. 3C shows a perspective view of the double-walled disposable cooler with handle having the lid in the open position in accordance with the second embodiment of the present disclosure.
Figure 4A:
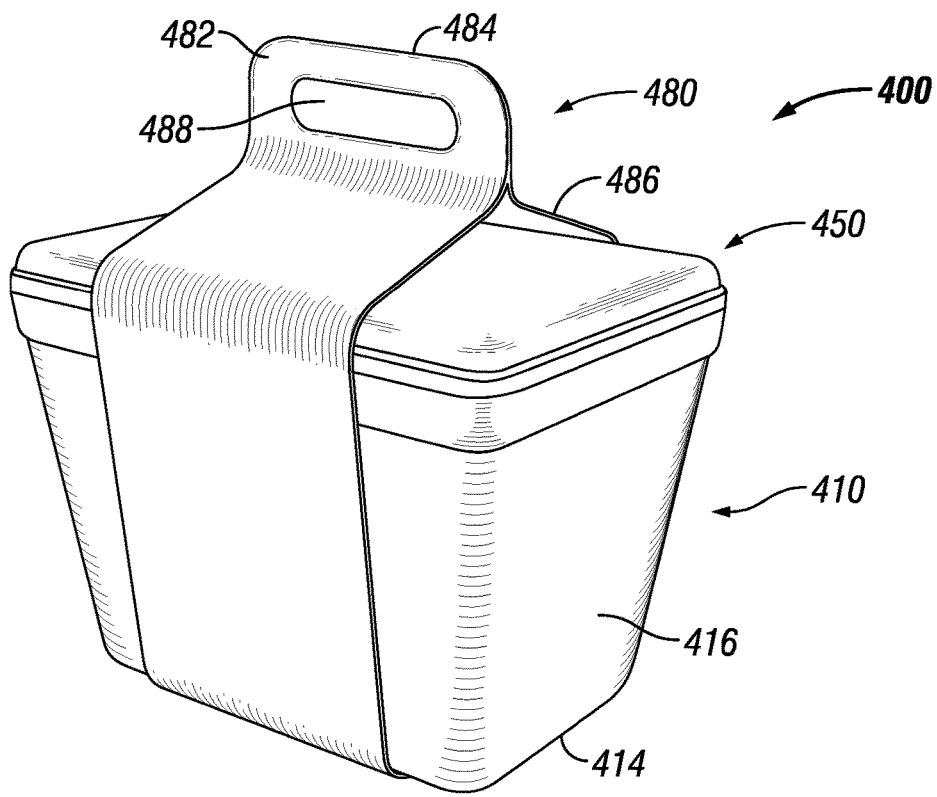
FIG. 4A shows a perspective view of a disposable cooler with a handle in accordance with a third embodiment of the present disclosure.
Figure 4B:
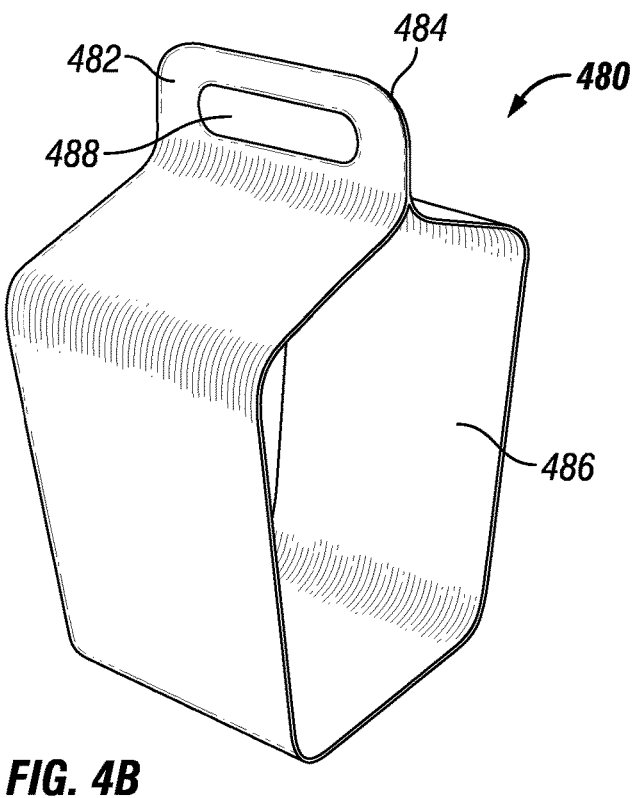
FIG. 4B shows a perspective view of the handle in accordance with the third embodiment of the present disclosure.
Figure 5:
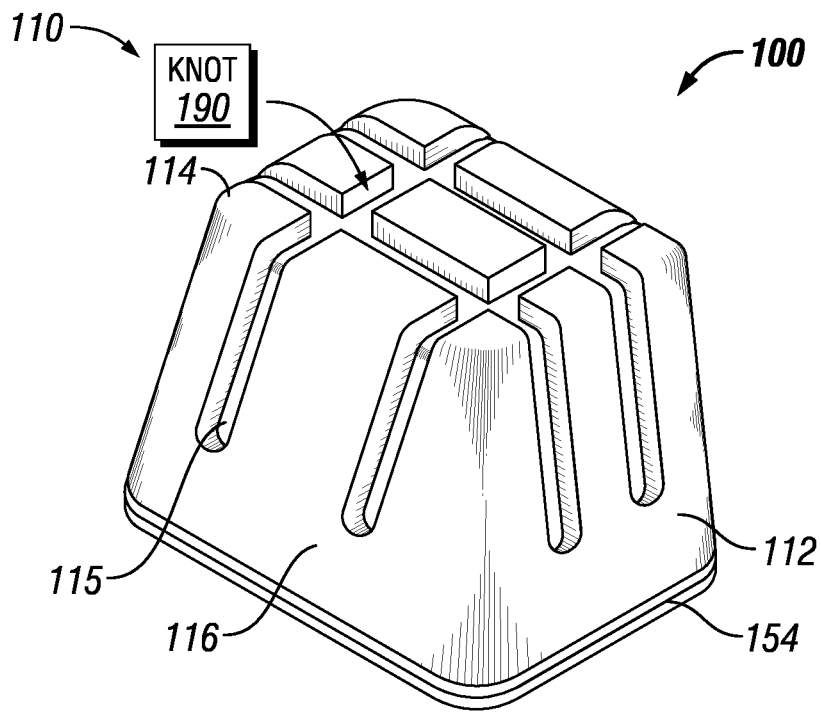
FIG. 5 shows a bottom perspective schematic diagram of a cooler with handle in accordance with the first embodiment of the present disclosure.
Figure 6:
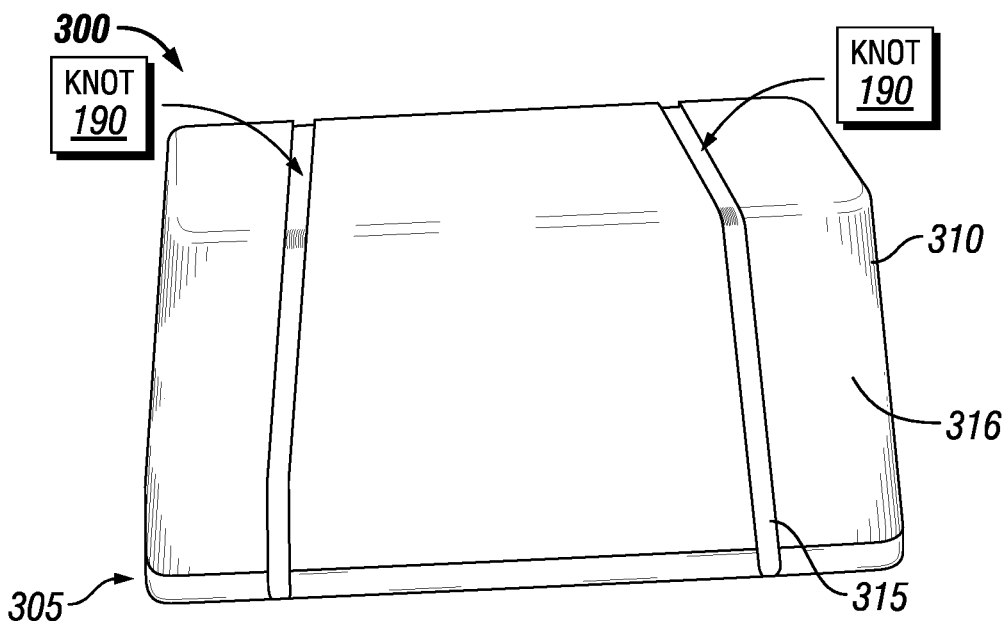
FIG. 6 shows a bottom perspective schematic diagram of a disposable cooler with handle in accordance with the second embodiment of the present disclosure.

The accompanying figures illustrate various embodiments of the disposable cooler with handle. Although the figures are described as being a disposable, double-walled cooler, the embodiments of the invention also include disposable, single-walled coolers or may not be disposable in other embodiments. As described in detail hereinbelow, FIGS. 1A and 1B include perspective views of a double-walled disposable cooler with handle in accordance with a first embodiment of the present disclosure; FIG. 1C shows a perspective view of a knot used to form the handle of the double-walled disposable cooler of FIG. 1A in accordance with the first embodiment of the present disclosure; FIGS. 2A-2D show several views of the double-walled disposable cooler of FIG. 1A without the handle in accordance with the first embodiment of the present disclosure; FIGS. 3A-3C show several views of a double-walled disposable cooler with handle in accordance with a second embodiment of the present disclosure; FIG. 4A shows a perspective view of a disposable cooler with a handle in accordance with a third embodiment of the present disclosure; and FIG. 4B shows a perspective view of the handle of FIG. 4A in accordance with the third embodiment of the present disclosure.

It is understood that the aforementioned embodiments and features associated therewith are not mutually exclusive of each other. Any of the features shown to be associated with an embodiment described herein may be adopted in another embodiment described herein. Therefore, the description herein of various embodiments does not imply that any features associated with a particular embodiment are limited solely to said embodiment.

Figure 1C:
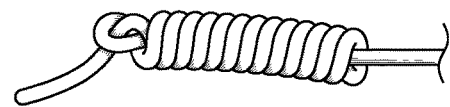
FIG. 1C shows a perspective view of a knot used in forming the handle of the double-walled disposable cooler in accordance with the first embodiment of the present disclosure.
Figure 1B:
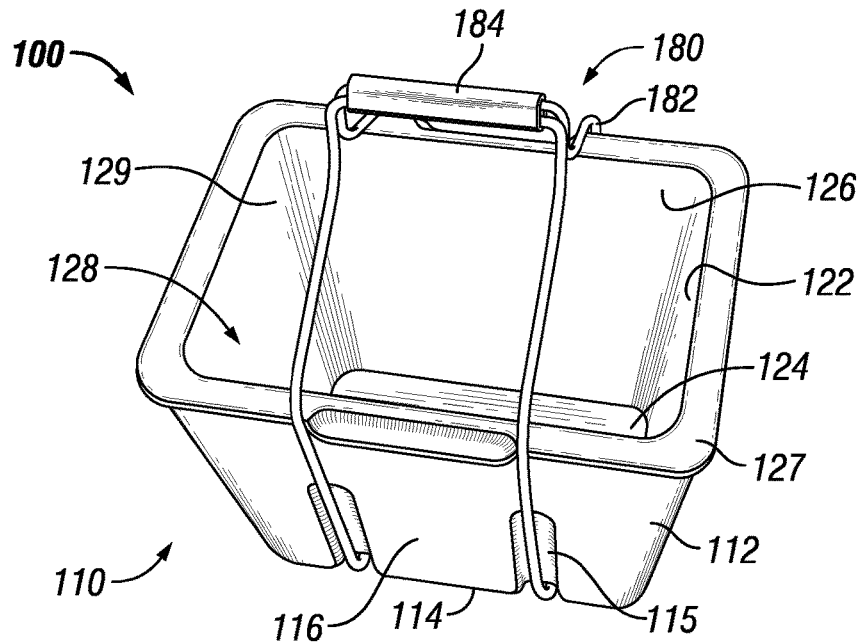
FIG. 1B shows a perspective view of a double-walled disposable cooler with handle having a lid removed in accordance with the first embodiment of the present disclosure.

FIG. 1A shows a perspective view of a double-walled disposable cooler 100 with handle 180 in accordance with a first embodiment of the present disclosure. FIG. 1B shows a perspective view of the double-walled disposable cooler with handle of FIG. 1A having a lid 160 removed in accordance with the first embodiment of the present disclosure. FIG. 1C shows a perspective view of a knot 190 used in forming the handle 180 of the double-walled disposable cooler 100 in accordance with the first embodiment of the present disclosure. FIG. 2A shows a front view of the double-walled disposable cooler 100 of FIG. 1A without the handle 180 in accordance with the first embodiment of the present disclosure. FIG. 2B shows a side view of the double-walled disposable cooler 100 of FIG. 1A without the handle 180 in accordance with the first embodiment of the present disclosure. FIG. 2C shows a top view of the double-walled disposable cooler 100 of FIG. 1A without the handle 180 in accordance with the first embodiment of the present disclosure. FIG. 2D shows a cross-sectional side view of the double-walled disposable cooler 100 of FIG. 1A without the handle 180 in accordance with the first embodiment of the present disclosure. Referring to FIGS. 1A-2D, the double-walled disposable cooler 100 with handle 180 will be described in accordance with the first embodiment of the present disclosure. Although FIGS. 1A-2D illustrate and are described as a double-walled disposable cooler, the cooler may be a single-walled disposable cooler without departing from the scope and spirit of the embodiments of the invention.

The double-walled cooler 100 includes a body 110, a lid 150, and a handle 180 according to some exemplary embodiments. However, the doubled-walled cooler 100 may include additional features without departing from the scope and spirit of the exemplary embodiment. The body 110 includes an outer shell 112 and an inner shell 122 disposed substantially within the outer shell 112. Each of the outer shell 112 and the inner shell 122 are made entirely of a disposable, biodegradable and/or recyclable material, such as a pulp-based material, paper, sugar cane, hemp, bamboo, or similar type material.

The outer shell 112 includes a base 114, a plurality of support walls 116 coupled to the base 114, and a lip 117 extending substantially horizontally from the support walls 116 at a distal end from the base 114. At least one of the plurality of support walls 116 may be attached to an edge of the base 114, such as by an adhesive or some other similar attachment mechanism, or alternatively, one or more of the plurality of support walls 116 extend continuously or seamlessly from the edges of the base 114. At least one of the support walls 116 can include an entirely planar surface. That is, the support walls 116 can be formed such that the surface of at least one support wall 116 is disposed entirely in a single plane. In one example, two support walls 116 disposed on opposite sides of the base 114 can include entirely planar surfaces, respectively, while two other support walls 116 disposed on opposite sides of the base 114, each of which is substantially perpendicular to the two entirely planar support walls 116, can include non-entirely planar surfaces, respectively. The support walls 116 and the base 114 can define an interior cavity 118 of the outer shell 112. The support walls 116 can extend upwardly from the base 114 to form an opening 119 at an upper terminus of the outer shell 112. The opening 119 can be in fluid communication with the interior cavity 118 of the outer shell 112. In some embodiments, the lip 117 extends outwardly away from the opening 119 at the distal end of each support wall 116; however, in other embodiments, the lip 117 may extend inwardly into the opening 119 at the distal end of each support wall 116. According to some exemplary embodiments, at least each of two opposing support walls 116 and the base 114 of the outer shell 112 include two channels 115 that each extend longitudinally along at least a portion of the vertical length on the outer surface of the respective support walls 116 and horizontally along the outer surface of the base 114. However, in some other exemplary embodiments, each of the plurality of support walls 116 of the outer shell 112 include two channels 115 that each extend longitudinally along at least a portion of the vertical length on the outer surface of the respective support walls 116 and the outer surface of the base 114 includes a pair of channels 115 extending from one edge of the base 114 to the opposing edge of the base 114 and another pair of channels 115 extending from another adjacent edge of the base 114 to the opposing edge of the base 114 such that the channels 115 on the base 114 form a configuration similar to a tic-tac-toe board. The channels 115 that are formed along the outer surface of the outer shell 112 are continuous from one supporting wall 116 to the base 114, and from the base 114 to the opposing supporting wall 116. In some embodiments, the channels 115 on each support wall 116 that includes the channels 115 are parallel to one another. In certain exemplary embodiments, the channels 115 extend from the lower end of the support wall 116 toward the upper end of the support wall 116 but not to the upper end of the support wall 116. In yet other exemplary embodiments, the channels 115 extend the entire longitudinal length from the lower end of the support wall 116 to the upper end of the support wall 116.

Similarly, the inner shell 122 includes a base 124, a plurality of support walls 126 coupled to the base 124, and a lip 127 extending substantially horizontally from the support walls 126 at a distal end from the base 124. At least one of the plurality of support walls 126 may be attached to an edge of the base 124, such as by an adhesive or some other similar attachment mechanism, or alternatively, one or more of the plurality of support walls 126 extend continuously or seamlessly from the edges of the base 124. At least one of the support walls 126 can include an entirely planar surface. That is, the support walls 126 can be formed such that the surface of at least one support wall 126 is disposed entirely in a single plane. In one example, two support walls 126 disposed on opposite sides of the base 124 can include entirely planar surfaces, respectively, while two other support walls 126 disposed on opposite sides of the base 124, each of which is substantially perpendicular to the two entirely planar support walls 126, can include non-entirely planar surfaces, respectively. The support walls 126 and the base 124 can define an interior cavity 128 of the inner shell 122. The support walls 126 can extend upwardly from the base 124 to form an opening 129 at an upper terminus of the inner shell 122. The opening 129 can be in fluid communication with the interior cavity 128 of the inner shell 122. In some embodiments, the lip 127 extends outwardly away from the opening 129 at the distal end of each support wall 126; however, in other embodiments, the lip 127 may extend inwardly into the opening 129 at the distal end of each support wall 126.

Once the inner shell 122 is disposed into the interior cavity 118 of the outer shell 112, such that the inner shell's base 124 is positioned adjacent the outer shell's base 114, the inner shell's lip 127 is aligned with the outer shell's lip 117. The inner shell's lip 127 is coupled to the outer shell's lip 117 using an adhesive or some other fastening mechanism, such as protrusions formed on one lip 117, 127 that may snap into an indentation formed on the other lip 127, 117. Also, once the inner shell 122 is disposed into the interior cavity 118 of the outer shell 112, such that the inner shell's base 124 is positioned adjacent the outer shell's base 114, the a portion of the outer shell's interior cavity 118 remains disposed between the outer shell's support walls 116 and the inner shell's support walls 126 and also between the outer shell's base 114 and the inner shell's base 124. This remaining portion of the outer shell's interior cavity may be empty, i.e. filled with air, or may be filled with some other material that can prevent or reduce heat transfer from the inner shell's interior cavity 128 to the exterior of the outer shell 112.

Although the body 110 is described as being double-walled and having an outer shell 112 and an inner shell 122, the body may be single-walled without departing from the scope and spirit of the exemplary embodiments.

The cooler 100 can further include a lid 150 capable of covering or substantially covering the inner shell's opening 129. In this regard, the lid 150 can be configured to reversibly couple with the body 110 of the cooler 100 in any of a variety of ways, some of which are described herein across the various embodiments. The lid 150 can be shaped in conformity with the inner shell's opening 129. According to some embodiments, the lid 150 is made entirely of a disposable, biodegradable and/or recyclable material, such as a pulp-based material, paper, sugar cane, hemp, bamboo, or similar type material.

According to some exemplary embodiments, the lid 150 is double-walled and includes an outer wall 152 and an inner wall 162; however, in other embodiments, the lid 150 may be single-walled. In the present embodiment, the outer wall 152 includes a rim 154 extending from the edges of the outer wall 152. In some embodiments, the rim 154 extends inwardly from the edges of the outer wall 152, while in other embodiments, the rim 154 extends outwardly from the edges of the outer wall 152. The outer surface of the outer wall 152 can be formed to include various features. For instance, the outer surface of the lid's outer wall 152 can be formed with one or more cup holders 351 (FIG. 3A). The one or more cup holders 351 (FIG. 3A) can be formed into the outer surface of the lid's outer wall 152 in any suitable configuration. Characteristics such as the dimensions, positioning, and number of the one or more cup holders 351 (FIG. 3A) can vary.

The lid's inner wall 162 includes a rim 164 extending from the edges of the inner wall 162. In some embodiments, the rim 164 extends inwardly from the edges of the inner wall 162, while in other embodiments, the rim 164 extends outwardly from the edges of the inner wall 162. The inner wall 162 is formed with at least one inner protrusion 166 and at least one outer protrusion 168. The inner protrusion 166 is formed adjacent opposite edges of the lid's inner wall 162 such that when the lid 150 is placed on top of the body 110, the inner protrusion 166 extends into inner shell's interior cavity 128 adjacent the inner shell's opposing support walls 126. Alternatively, the inner protrusion 166 extends adjacently around the entire perimeter of the lid's inner wall 162 such that when the lid 150 is placed on top of the body 110, the inner protrusion 166 extends into inner shell's interior cavity 128 adjacent all of the inner shell's support walls 126. The inner protrusion 166 may be continuous and adjacently formed around the perimeter of the lid's inner wall 162 or may be discontinuous in some embodiments. The inner protrusion 166 prevents the lid 150 from moving and inadvertently coming off the body 150 once the lid 150 is positioned on top of the body 150 and covering the inner shell's opening 129. The outer protrusion 168 is formed along the outer surface of the lid's inner wall 162 and extending from one end of the inner wall 162 to an opposing end of the inner wall 162. According to some embodiments, there may be one outer protrusion 168 extending at about the middle of the inner wall 162 and two other outer protrusions 168 extending on each side of the middle outer protrusion 168. Although three outer protrusions 168 are shown in the embodiment, there may be greater or fewer outer protrusions in other embodiments. Further, although the outer protrusion 168 is shown as being continuous from one end of the inner wall 162 to an opposing end of the inner wall 162, the outer protrusion may be discontinuous or randomly formed along the outer surface of the inner wall 162. Once the inner wall 162 is coupled to the outer wall 152, these outer protrusions 168 provide structural support for lid's outer wall 152, such as when the lid 150 is coupled to the body 110 and some item, such as a beverage, is placed on top of the lid's outer wall 152. These outer protrusions 168 helps prevent the lid's outer wall 152 from caving in.

To form the lid 150, the outer wall 152 is placed over the inner wall 162 such that the outer wall's rim 154 is aligned with the inner wall's rim 164. The outer wall's rim 154 is coupled to the inner wall's rim 164 using an adhesive or some other fastening mechanism, such as protrusions formed on one rim 154, 164 that may snap into an indentation formed on the other rim 164, 154. Once the outer wall 152 is coupled to the inner wall 162, an interior cavity 169 is formed therebetween, where the outer protrusions 168 are disposed therein. Interior cavity 169 may be empty, i.e. filled with air, or may be filled with some other material that can prevent or reduce heat transfer from the inner shell's interior cavity 128 to the exterior of the lid 150.

The lid 150 can be formed so as to fit inside of the upper ends of the plurality of support walls 126. Alternatively, the lid 150 may be formed so as to cover and sit atop the distal ends and lip 127 of the body 110. Further, although the lid 150 is described as being double-walled, the lid 150 may be single-walled without departing from the scope and spirit of the exemplary embodiments.

The handle 180 wraps about the body 110 and extends from one outer shell's support wall 116, around the base 114, around the opposite outer shell's support wall 116, and above the lid 150. The handle 180 allows a user to carry the cooler 100 with one hand, while allowing the other hand to remain free or carry something else. The handle 180 includes a rope 182 and a wrap 184. The rope is fabricated using twine, but other suitable materials such as hemp, jute, or other disposable, biodegradable and/or recyclable material may be used without departing from the scope and spirit of the embodiment. Generally, the rope 182 is 5/16-inch diameter, but other suitable diameters may be used. According to one embodiment, the rope 182 is positioned in a channel 115 on an outer surface of the base 114 and continues to the edge of the base 114 and then up and still within the channel 115 along one of the plurality of outer shell's support walls 116. The rope 182 leaves the channel 115 and extends beyond the distal end of the support wall 116 for a distance above the lid 150 before returning back to a different channel 115 on the same support wall 116. The rope 182 continues along this other channel 115 and through the continuous channel 115 along the base 114 before extending back upwards along the continuous channel 115 on opposing support wall 116. The rope 182 leaves the channel 115 and extends beyond the distal end of this opposing support wall 116 for a distance above the lid 150 before returning back to a different channel 115 (same channel 115 that the rope 182 started along on the base 114) on this opposing support wall 116. The rope 182 continues along this other channel 115 and turns along the channel 115 on the base 114 until it meets the beginning portion of the rope 182. The two ends of the rope 182 are tied into the knot 190 which is retained within the channel 115 along the base 114, thereby allowing the base 114 to sit flat on a planar surface, e.g. ground. Although the rope 182 is oriented in one manner in this embodiment, the rope 182 may be oriented in a different manner for the handle 180, such as that describe in conjunction with FIGS. 3A-3C. The wrap 184 is designed to wrap around the two extended portions of the rope 182 that extends beyond the distal ends, or upper ends, of the body 110. The wrap 184 is fabricated from pulp, cardboard, or some other disposable, biodegradable and/or recyclable material. The wrap 184 wraps around the two loops of rope 182 that is created when it extended above and beyond the lid 150 and is coupled to itself using an adhesive, Velcro®, or by tucking a portion of itself into a slot formed therein so as to keep it secured in place. This wrap 184 allows a user to hold the cooler 100 by this handle 180 with one hand and transport it anywhere with ease and comfort. In some embodiments, the wrap 184 is optional.

Notably, the body 110, the lid 150 and the handle 180 of the cooler 100 can be made entirely of a disposable, biodegradable and/or recyclable material, such as a pulp-based material. Alternatively, the body 110 can be made entirely of a disposable, biodegradable and/or recyclable material, such as a pulp-based material, and the lid 150 and the handle 180 can be made of a non-biodegradable and/or non-recyclable material, such as a plastic, other polymer material, or other known material type that can be used for coolers. Hence, any one or more of the body 110, the lid 150 and the handle 180 of the cooler 100 can be made entirely of a disposable, biodegradable and/or recyclable material, such as a pulp-based material.

Pulp, as is generally known in the art, is a fibrous material prepared by chemically or mechanically separating cellulose fibers from wood, recycled paper, straw, grass, or other raw fibrous materials. Pulp is understood to be more eco-friendly than polystyrene, as pulp can be biodegradable (i.e., capable of disintegrating into an innocuous material), recyclable (i.e., capable of being reused or treated for reuse), and/or compostable (i.e., capable of decomposing within 90-180 days), without release of toxic residues upon decomposition.

In some cases, the pulp-based material from which the cooler 100 is made can derive entirely from pre-consumer recycled paper. In other cases, the pulp-based material from which the cooler 100 is made can derive from a combination of the recycled paper and a wax additive (e.g., paraffin wax) added to enhance the water resistance of the cooler 100. In yet other cases, a small amount of rosin (a solid form of resin) can be added to the pulp-based material to enhance the cooler's durability. It is understood, however, that the pulp-based material can be derived from any suitable pulp-producing materials generally known in the art. Additionally, any one or more of the body 110, the lid 150, and the handle 180 can be formed from other disposable, biodegradable and/or recyclable material such as paper, sugar cane, hemp, jute, bamboo, and other similar type materials.

FIG. 3A shows a perspective view of a double-walled disposable cooler 300 with handle 380 in accordance with a second embodiment of the present disclosure. FIG. 3B shows a cross-sectional side view of the double-walled disposable cooler 300 of FIG. 3A in accordance with the second embodiment of the present disclosure. FIG. 3C shows a perspective view of the double-walled disposable cooler 300 with handle 380 having the lid 350 in the open position in accordance with the second embodiment of the present disclosure. Referring to FIGS. 3A-3C, the double-walled disposable cooler 300 with handle 380 will be described in accordance with the second embodiment of the present disclosure.

The double-walled disposable cooler 300 includes a body 310, a lid 350, and a handle 380. The cooler 300 is similar to cooler 100 (FIG. 1A) except for a few differences as discussed herein. Also, as mention with respect to the previous embodiment, the body 310 may be single-walled instead of double-walled without departing from the scope and spirit of the exemplary embodiments described herein.

With respect to cooler 300, the outer surface of the lid's outer wall 352 is formed with one or more cup holders 351. The one or more cup holders 351 can be formed into the outer surface of the lid's outer wall 352 in any suitable configuration. In the present embodiment, there are four cup holders 351 that are formed into the outer surface of the lid's outer wall 352 and a plurality of channels 353 are formed into the outer surface of the lid's outer wall 352 extending from one cup holder 351 to two adjacent cup holders 351 such that a substantially rectangular orientation is formed.

Characteristics such as the dimensions, positioning, and number of the one or more cup holders 351 can vary.

With respect to cooler 300, the handle 380 wraps about the body 310 and extends from one outer shell's support wall 316, around the base 314, around the opposite outer shell's support wall 316, and above the lid 350. The handle 380 allows a user to carry the cooler 300 with one hand, while allowing the other hand to remain free or carry something else. Handle 380 includes two ropes 382, 383. According to the embodiment shown, the first rope 382 is positioned in a channel 315 on an outer surface of the base 314 and continues to the edge of the base 314 and then up and still within the channel 315 along one of the plurality of outer shell's support walls 316. The first rope 382 leaves the channel 315 and extends beyond the distal end of the support wall 316 for a distance above the lid 350 before returning back to the channel 315 on the opposing support wall 316. The first rope 382 continues along this channel 315 and through the continuous channel 315 along the base 314 until it meets the beginning portion of the first rope 382. The two ends of the first rope 383 are tied into the knot 190 (FIG. 1C) which is retained within the channel 315 along the base 314. Similarly, the second rope 383 is positioned in a different channel 315, parallel to the other channel 315, on an outer surface of the base 314 and continues to the edge of the base 314 and then up and still within the other channel 315 along one of the plurality of outer shell's support walls 316, same support wall 316 as the first rope 382. The second rope 382 leaves the channel 315 and extends beyond the distal end of the support wall 316 for a distance above the lid 350 before returning back to the channel 315 on the opposing support wall 316. The second rope 383 continues along this channel 315 and through the continuous channel 315 along the base 314 until it meets the beginning portion of the second rope 383. The two ends of the second rope 383 are then tied into the knot 190 (FIG. 1C) which is retained within the channel 315 along the base 314. The two extended portions of the first rope 382 and the second rope 383 that extend beyond the distal ends, or upper ends, of the body 310 can be held together to lift and transport the cooler 300 with one hand. Optionally, a wrap 184 (FIG. 1A) can be used to wrap the extended portions of the first rope 382 and the second rope 383.

With respect to cooler 300, the lid 350 is coupled to the body 310 using one or more hinges or latches 395 such that the lid 350 remains coupled to the body 310 when in a closed position 305 or when in an open position 307.

Pursuant to any of the embodiments described above and referring to FIGS. 1-3, the body 110, 310 of a second cooler 100, 300 can be stackable with the body 110, 310 of a first cooler 100, 300 according to some embodiments. In those embodiments, each of the plurality of support walls 126, 326 of each cooler 100, 300 is oriented outwardly (not perpendicular) from the base 114, 314 so that the opening 129, 329 that is formed at the distal ends of the support walls 126, 326 is larger than the base 114, 314. The base 114, 314 of the second cooler 100, 300 is insertable into the opening 129, 329 of the first cooler 100, 300, such that the second cooler 100, 300 slides downwardly into the interior cavity 128, 328 of the first cooler 100, 300. Similarly, the body 110, 310 of a third cooler 100, 300 can slide into the interior cavity 128, 328 of the second cooler 100, 300. This can be repeated as the bodies 110, 310 of the coolers 100, 300 is stackable with one another.

FIG. 4A shows a perspective view of a disposable cooler 400 with a handle 480 in accordance with a third embodiment of the present disclosure; and FIG. 4B shows a perspective view of the handle 480 in accordance with the third embodiment of the present disclosure. Referring to FIGS. 4A and 4B, the cooler 400 includes a body 410, a lid 450, and a handle 480 according to some exemplary embodiments.

According to certain exemplary embodiments, the body 410 is made entirely of a disposable, biodegradable and/or recyclable material, such as a pulp-based material, paper, sugar cane, hemp, bamboo, or similar type material. The body 410 includes a base 414 and a plurality of support walls 416 coupled to the base 414. According to certain exemplary embodiments, the body 410 is fabricated as a single component with no seams, while in other embodiments, the body 410 includes seams, such as when at least one of the plurality of support walls 416 is attached to an edge of the base 414, such as by an adhesive or some other similar attachment mechanism, or alternatively, one or more of the plurality of support walls 416 is attached to another support wall 416. Each of the support walls 416 extend upwards from the base 414. The support walls 416 and the base 414 defines an interior cavity (not shown), similar to interior cavity 128 (FIG. 1B). The support walls 416 extends upwardly from the base 414 to form an opening (not shown), similar to opening 129 (FIG. 1B), at an upper terminus of the body 410. The opening is in fluid communication with the interior cavity of the body 410 to allow food and/or beverages to be placed therein.

The cooler 400 further includes the lid 450 capable of covering or substantially covering the opening of the body 410. In this regard, the lid 450 can be configured to reversibly couple with the body 410 of the cooler 400 in any of a variety of ways, some of which are described herein across the various embodiments. The lid 450 can be shaped in conformity with the body's opening 129 (FIG. 1B). According to some embodiments, the lid 450 is made entirely of a disposable, biodegradable and/or recyclable material, such as a pulp-based material, paper, sugar cane, hemp, bamboo, or similar type material. According to some exemplary embodiments, the lid 450 is double-walled; however, according to other exemplary embodiments, the lid 450 is single-walled. The lid 450 may include features of other lids described above, such as cup holders.

The cooler 400 further includes the handle 480. The handle 480 is fabricated from a disposable, biodegradable and/or recyclable material, such as a pulp-based material, paper, corrugated paper/cardboard material, sugar cane, hemp, bamboo, or similar type material, according to some exemplary embodiments. However, in other exemplary embodiments, the handle 480 may be fabricated using a rubber or other polymer material, or even a metal or any other suitable material, in which the handle 480 can be reused from one cooler 400 to the next. The handle 480 includes a first end 482 and a second end 484 and wraps about the body 410, by extending around one support wall 416, around the base 414, around the opposite support wall 416, and above the lid 450. The first end 482 and the second end 484 are coupled to one another above the lid 450, whereby the coupling occurs by adhesives or by fastening the first end 482 to the second end 484. The coupling of the first end 482 to the second end 484 forms a first opening 486 through which the cooler 400 can be inserted partially therethrough and carried. Adjacent the first end 482 and the second end 484, an second opening 488 is formed therethrough, such that the second opening 488 allows a user to insert their fingers through the second opening 488 to lift and transport the cooler 400 once the handle 480 is placed on the cooler 400. The cooler can be inserted into the first opening 486 according to some exemplary embodiments, while in other exemplary embodiment, the handle 480 wraps around the cooler 400 and then has its first end 482 and second end 484 coupled to one another. The handle 480 allows a user to carry the cooler 400 with one hand, while allowing the other hand to remain free or carry something else.

In summary, with respect to each of the exemplary embodiments presented herein, the handles 180, 380, 480 allows a user to carry the cooler 100, 300, 400 with one hand, while allowing the other hand to remain free or carry something else. This is done by having the handle 180, 380, 480 wrap around a supporting wall, the base, and an opposite supporting wall of the cooler 100, 300, 400 and extend above and beyond the lid 150, 350, 450, where the portion of the handle 180, 380, 480 extending beyond the lid 150, 350, 450 facilitates a user in carrying and transporting the cooler 100, 300, 400 with one hand while allowing the other hand to remain free or carry something else.

Further, although a double-walled cooler is depicted within the figures of this application, the cooler can be single-walled without departing from the scope and spirit of the exemplary embodiments. As a result, the cooler, whether double-walled or single-walled, can be disposed in an eco-friendly manner, including the handles, in which the cooler disintegrates in a compost environment rapidly relative to conventional polystyrene coolers and without leaving toxicity into the soil. The disposable, biodegradable and/or recyclable material, such as a pulp-based material, used for fabricating the double-walled cooler described herein, or single-walled cooler, can comply with modern regulations prohibiting sale of polyethylene products, while providing consumers with a storage solution that is disposable. Moreover, the double-walled disposable cooler described herein, or single-walled cooler, can include convenient features such as cup holders, handles, and the like, and reliably retain water for several days upon adding a wax additive to the pulp-based material used to construct the cooler.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A cooler, comprising:
    a body comprising a base and a plurality of support walls coupled to the base and extending upwardly therefrom, the base and the plurality of support walls defining an interior cavity therein and forming a body opening at distal ends of the plurality of support walls;
    wherein an outer surface of the body comprises a first channel and a second channel, wherein each of the first channel and the second channel are formed along the base and continue upwards along at least a portion of a first support wall and at least a portion of a second support wall, wherein the second support wall is opposing the first support wall, wherein the first channel is parallel to the second channel;
    a lid substantially covering the body opening; and
    a handle comprising:
        a first rope, wherein at least a portion of the first rope is inserted within the first channel and extends beyond the distal ends of each of the first and second support walls, and wherein a first knot is formed within the first channel located at the base, the first rope forming a first closed-loop beyond the distal ends of the plurality of support walls; and
        a second rope, wherein at least a portion of the second rope is inserted within the second channel and extends beyond the distal ends of each of the first and second support walls, and wherein a second knot is formed within the second channel located at the base, the second rope forming a second closed-loop beyond the distal ends of the plurality of support walls;
    wherein the handle is configured to allow a user to carry the body and the lid with one hand.

2. The cooler of claim 1, wherein at least the body and the lid are made entirely of a disposable, biodegradable and/or recyclable material.

3. The cooler of claim 2, wherein the disposable, biodegradable and/or recyclable material is a pulp-based material.

4. The cooler of claim 2, wherein the disposable, biodegradable and/or recyclable material is a pulp-based material made with a combination of recycled paper and wax.

5. The cooler of claim 2, wherein the disposable, biodegradable and/or recyclable material is a pulp-based material that includes a wax additive.

6. The cooler of claim 2, wherein the disposable, biodegradable and/or recyclable material is a pulp-based material that is compostable.

7. The cooler of claim 2, wherein the handle is made entirely of a disposable, biodegradable and/or recyclable material.

8. The cooler of claim 1, wherein the handle further comprises a wrap, the wrap enclosing a portion of the first closed-loop of the first rope and a portion of the second closed-loop of the second rope.

9. The cooler of claim 8, wherein the wrap is made from at least one of pulp and cardboard.

10. The cooler of claim 1, wherein the first rope and the second rope are made from at least one of twine, hemp, and jute.

11. The cooler of claim 1, wherein the body is double-walled.

12. The cooler of claim 1, wherein the body is single-walled.

13. A cooler, comprising:
    a body comprising a base and a plurality of support walls coupled to the base and extending upwardly therefrom, the base and the plurality of support walls defining an interior cavity therein and forming a body opening at distal ends of the plurality of support walls;
    wherein an outer surface of the body comprises a first channel and a second channel, wherein each of the first channel and the second channel are formed along the base and continue upwards along at least a portion of a first support wall and at least a portion of a second support wall, wherein the second support wall is opposing the first support wall, wherein the first channel is parallel to the second channel;
    a lid substantially covering the body opening; and
    a handle comprising a rope, wherein at least a portion of the rope is inserted within the first channel of the base and extends beyond a distal end of the first support wall having the first channel and returns back to the second channel formed in the first support wall, and proceeds along the second channel formed in the base and extends beyond a distal end of the second support wall, and then returns back to the first channel formed in the second support wall, and proceeds back to the first channel in the base, wherein a knot is formed within the first channel located at the base, the rope forming a first closed-loop beyond the distal end of the first support wall and a second closed-loop beyond the distal end of the second support wall, wherein the handle is configured to allow a user to carry the body and the lid with one hand.

14. The cooler of claim 13, wherein the handle further comprises a wrap, the wrap enclosing a portion of the first closed-loop and a portion of the second closed-loop that are formed above the distal ends of the first and second support walls.

15. The cooler of claim 13, wherein at least the body and the lid are made entirely of a disposable, biodegradable and/or recyclable material.

16. The cooler of claim 15, wherein the disposable, biodegradable and/or recyclable material is selected from at least one of a corrugated cardboard material and a pulp-based material.

* * * * *